(12) United States Patent
Miyazaki

(10) Patent No.: US 12,350,819 B2
(45) Date of Patent: Jul. 8, 2025

(54) MOVING MECHANISM STOPPING DEVICE AND ROBOT

(71) Applicant: FANUC CORPORATION, Yamanashi (JP)

(72) Inventor: Genki Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/709,633

(22) PCT Filed: Dec. 22, 2021

(86) PCT No.: PCT/JP2021/047627
§ 371 (c)(1),
(2) Date: May 13, 2024

(87) PCT Pub. No.: WO2023/119501
PCT Pub. Date: Jun. 29, 2023

(65) Prior Publication Data
US 2025/0001621 A1  Jan. 2, 2025

(51) Int. Cl.
*B25J 19/06* (2006.01)
*B25J 17/00* (2006.01)
*B25J 19/00* (2006.01)

(52) U.S. Cl.
CPC ........... *B25J 19/0004* (2013.01); *B25J 17/00* (2013.01)

(58) Field of Classification Search
CPC ........ B25J 19/06; B25J 9/101; Y10T 74/2063
USPC ........................................................ 74/89.37
See application file for complete search history.

(56) References Cited

U.S. PATENT DOCUMENTS

| | | | | |
|---|---|---|---|---|
| 3,080,840 A | * | 3/1963 | Heiko | B21D 43/105 |
| | | | | 414/718 |
| 3,447,692 A | * | 6/1969 | Thomas | B66C 23/94 |
| | | | | 212/280 |
| 3,456,810 A | * | 7/1969 | Ely | B66C 23/94 |
| | | | | 340/685 |
| 3,664,515 A | * | 5/1972 | Orendorff | B66C 23/94 |
| | | | | 212/292 |
| 3,717,231 A | * | 2/1973 | Kaufeldt | B25J 19/0091 |
| | | | | 192/139 |
| 3,954,188 A | * | 5/1976 | Boyle | B25J 9/101 |
| | | | | 901/18 |

(Continued)

FOREIGN PATENT DOCUMENTS

| | | | | |
|---|---|---|---|---|
| DE | 102009043404 A1 | * | 9/2011 | ............. B25J 9/101 |
| EP | 2301725 A1 | * | 3/2011 | ............. B25J 9/101 |

(Continued)

*Primary Examiner* — Randell J Krug
(74) *Attorney, Agent, or Firm* — Maier & Maier, PLLC

(57) ABSTRACT

A moving mechanism stopping device includes stoppers that are respectively provided on two members relative to each other, for restricting relative movements of the members by collision of the stoppers with each other, where: the two members are arranged so as to be spaced apart from each other in a direction orthogonal to a relative movement direction; and at least one of the stoppers includes a base that is detachably fixed to one of members, a deformable part that is integrally provided on the base and that is plastically deformed by impact of collision, and a deformation restriction part that is fixed to the base so as to be spaced apart from the deformable part in the relative movement direction and that comes into contact with the plastically deformed deformable part so as to restrict further plastic deformation thereof.

11 Claims, 11 Drawing Sheets

(56) References Cited

U.S. PATENT DOCUMENTS

| | | | | |
|---|---|---|---|---|
| 4,295,555 | A | * | 10/1981 | Kamm ................. B23P 23/06 192/139 |
| 4,828,094 | A | * | 5/1989 | Torii ..................... B25J 9/101 192/139 |
| 6,065,364 | A | * | 5/2000 | Shiraki ................. B25J 9/101 74/526 |
| 10,744,637 | B2 | * | 8/2020 | Fujioka ................. B25J 9/101 |
| 12,109,696 | B2 | * | 10/2024 | Ida ...................... B25J 19/0091 |
| 2007/0089963 | A1 | * | 4/2007 | Kinoshita ............... B25J 9/101 29/407.01 |
| 2011/0072918 | A1 | * | 3/2011 | Reekers ................. B25J 9/101 74/55 |
| 2011/0290059 | A1 | * | 12/2011 | Pan ..................... B25J 9/101 74/490.01 |
| 2013/0112031 | A1 | * | 5/2013 | Pan ..................... B25J 9/101 74/490.05 |
| 2014/0033853 | A1 | * | 2/2014 | Kitahara ................ B25J 19/00 74/490.05 |
| 2014/0060235 | A1 | * | 3/2014 | Ootani .................. B25J 19/00 74/490.05 |
| 2014/0331807 | A1 | * | 11/2014 | Kitahara ................ B25J 9/042 74/490.03 |
| 2015/0081096 | A1 | * | 3/2015 | Shiraki ................. F16P 3/142 74/813 L |
| 2015/0246450 | A1 | * | 9/2015 | Yoneda ................ B25J 19/0004 901/49 |
| 2019/0118374 | A1 | * | 4/2019 | Sha ..................... B25J 17/00 |
| 2019/0171247 | A1 | * | 6/2019 | Miyazaki ................ G05G 5/04 |
| 2020/0338762 | A1 | * | 10/2020 | Watanabe ............... B25J 9/101 |
| 2022/0184798 | A1 | * | 6/2022 | Norboe ................. B25J 19/0091 |
| 2023/0294273 | A1 | * | 9/2023 | Ida ..................... B25J 9/101 192/139 |

FOREIGN PATENT DOCUMENTS

| | | | |
|---|---|---|---|
| JP | H03-014353 U | | 2/1991 |
| JP | 2006068886 A | * | 3/2006 |
| JP | 2013031925 A | * | 2/2013 |
| JP | 2019098463 A | | 6/2019 |
| JP | 2020011374 A | * | 1/2020 ........... B25J 19/0091 |
| JP | 2020179443 A | * | 11/2020 ............. B25J 18/00 |
| JP | 2020192616 A | * | 12/2020 ............. B25J 19/00 |

* cited by examiner

MOVING MECHANISM STOPPING DEVICE AND ROBOT

TECHNICAL FIELD

The present disclosure relates to a moving mechanism stopping device and a robot.

BACKGROUND

In the related art, there is a known robot provided with a first stopper and a second stopper, wherein, among two members that rotate relative to each other about a prescribed axis, the first stopper is provided on one member and the second stopper is provided on the other member (for example, see Japanese Unexamined Patent Application, Publication No. 2019-098463).

When the two members are rotated relative to each other, the first stopper and the second stopper abut against each other, thereby restricting a relative movement range of the two members.

SUMMARY

An aspect of the present disclosure is a moving mechanism stopping device including stoppers that are respectively provided on two members moving relative to each other, and for restricting relative movements of the members by collision of the stoppers with each other, wherein: the two members are arranged so as to be spaced apart from each other in a direction orthogonal to a relative movement direction; and at least one of the stoppers includes a base that is detachably fixed to one of the members, a deformable part that is integrally provided on the base and that is plastically deformed by impact of collision, and a deformation restriction part that is fixed to the base so as to be spaced apart from the deformable part in the relative movement direction and that comes into contact with the plastically deformed deformable part so as to restrict further plastic deformation thereof.

DETAILED DESCRIPTION OF EMBODIMENTS

A moving mechanism stopping device 1 and a robot 100 according to an embodiment of the present disclosure will be described below with reference to the drawings.

Figure 1:
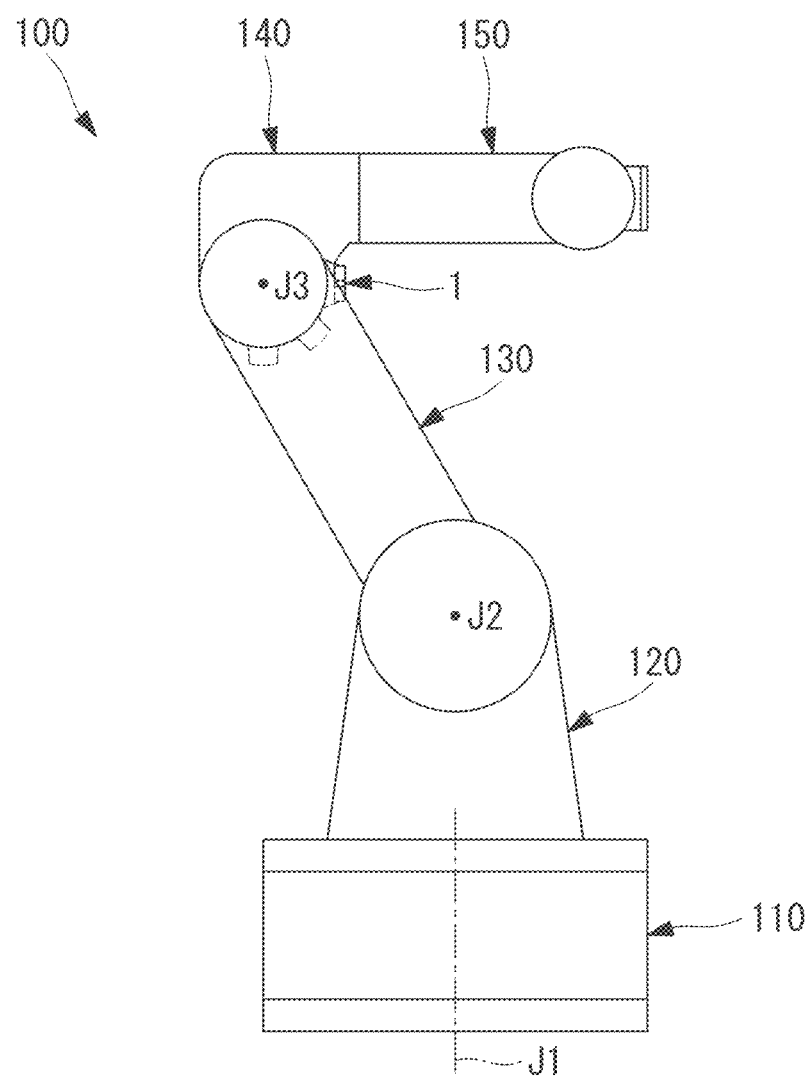
FIG. 1 is a schematic overall configuration diagram showing a robot according to an embodiment of the present disclosure.

In an example shown in FIG. 1, the robot 100 according to this embodiment is a six-axis articulated robot. The robot 100 includes a base 110 that is fixed to a floor surface and a revolving drum 120 that is rotatable about a vertical first axis J1 with respect to the base 110. In addition, the robot 100 includes a first arm 130 that is rotatable about a horizontal second axis J2 with respect to the revolving drum 120, a second arm 140 that is rotatable with respect to the first arm 130 about a third axis J3 parallel to the second axis J2, and a three-axis wrist unit 150 that is attached to the distal end of the second arm 140.

The moving mechanism stopping device 1 according to this embodiment is provided on at least one of six rotary joints (joints) of the robot 100. Here, a case in which the moving mechanism stopping device 1 is provided on a rotary joint that rotationally drives the second arm (one member) 140 about the third axis (axis) J3 with respect to the first arm (the other member) 130 will be described as an example.

Figure 2:
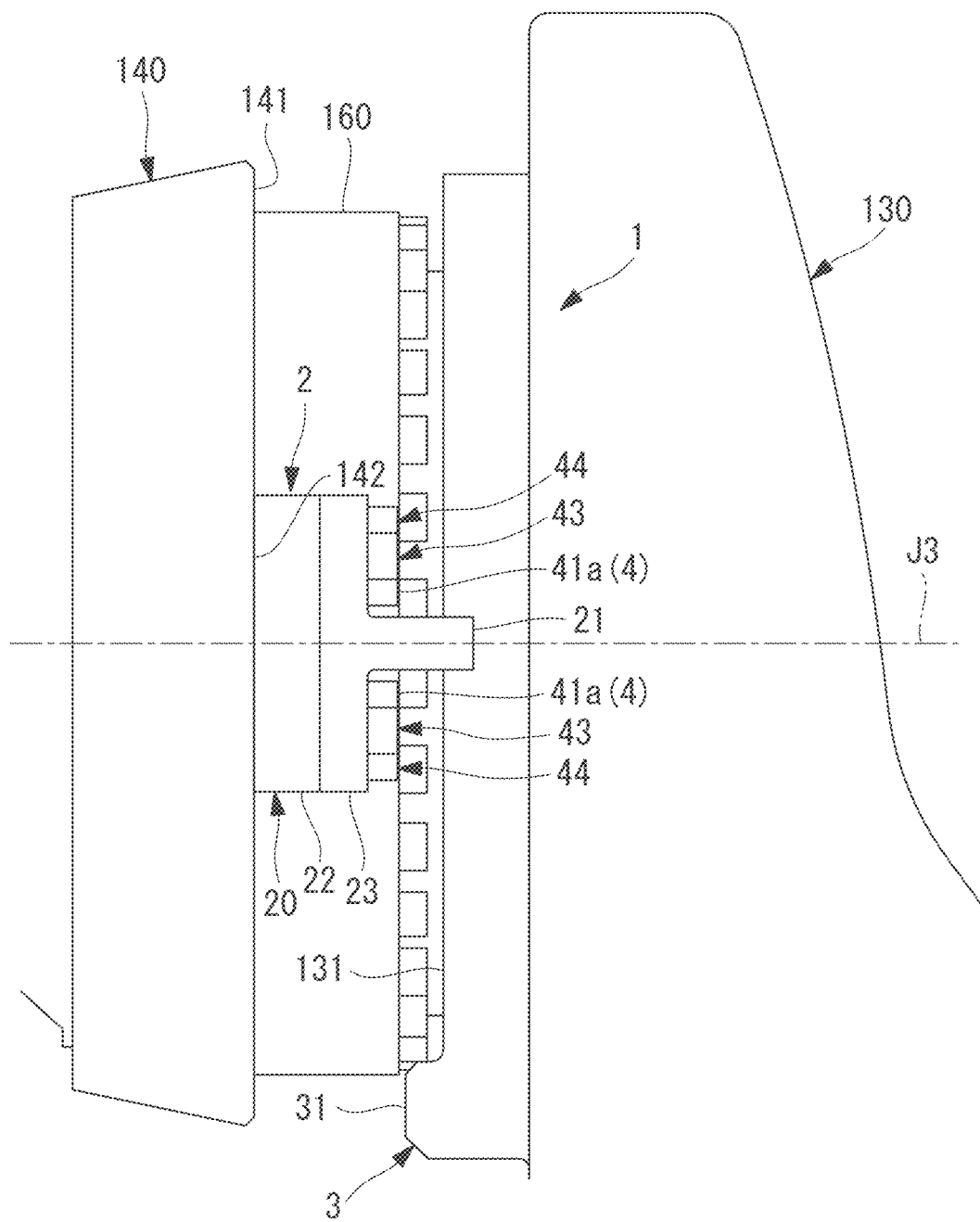
FIG. 2 is a front view showing a rotary joint between a first arm and a second arm of the robot in FIG. 1.

As shown in FIG. 2, the moving mechanism stopping device 1 includes a first stopper (one stopper) 2, a second stopper (the other stopper) 3, and deformation restriction members (deformation restriction parts) 4. The first stopper 2 is detachably attached to the second arm 140. The second stopper 3 is provided on the first arm 130.

A reducer 160 that decelerates the rotation of a shaft of a motor (not shown) to rotate the first arm 130 and the second arm 140 relative to each other is disposed between the first arm 130 and the second arm 140. Due to the thickness of the reducer 160 in a direction along the third axis J3, the first arm 130 and the second arm 140 are arranged so as to be spaced apart from each other in a direction orthogonal to a relative rotation direction (relative movement direction), in other words, in the direction along the third axis J3.

As shown in FIG. 2, the first stopper 2 includes: a base 20 that is fixed to a bearing surface 142 formed flush with or parallel to a reducer mounting surface 141 of the second arm 140; and a flat plate-shaped protrusion (deformable part) 21 that is provided on the base 20.

Figure 3:
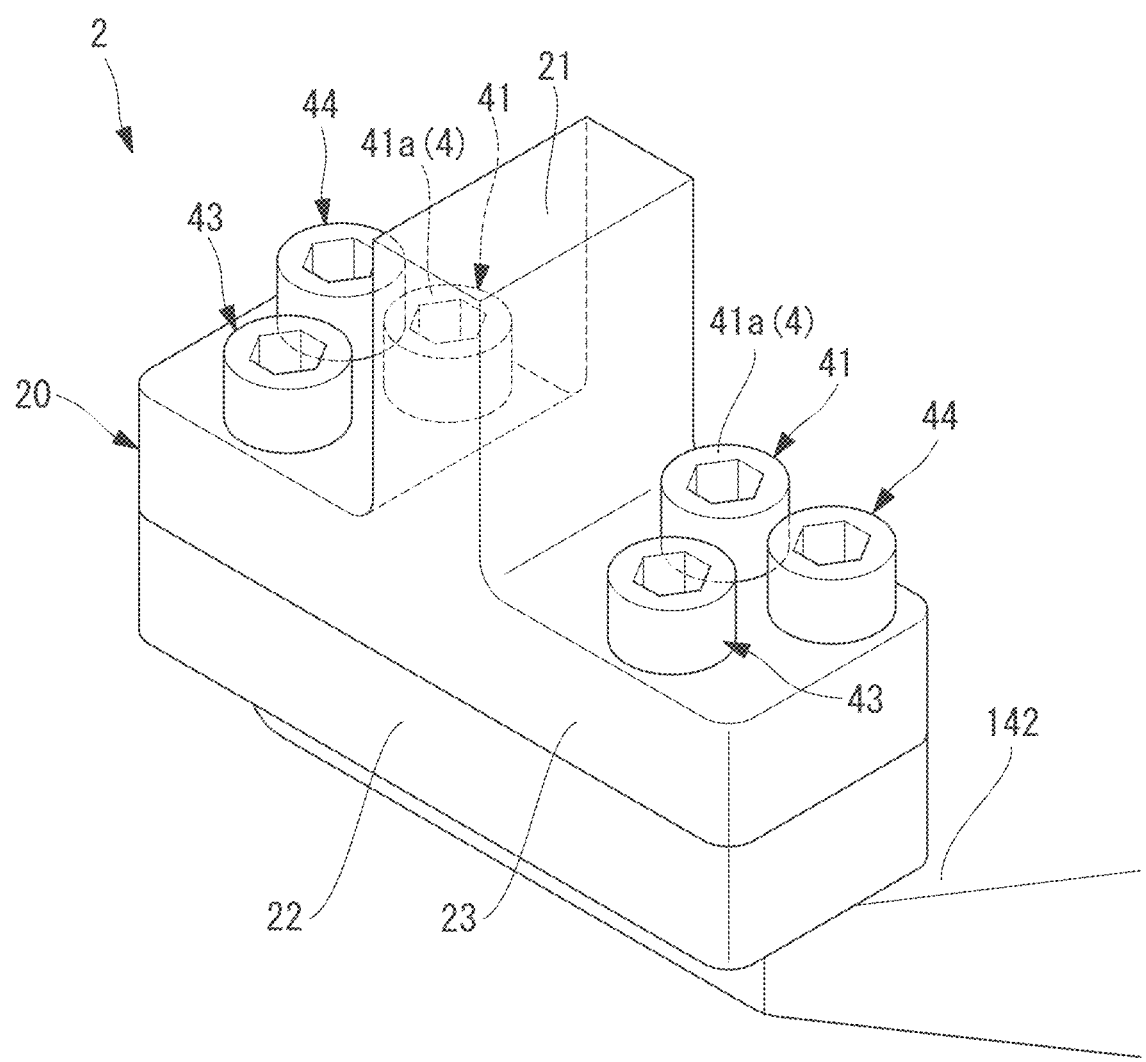
FIG. 3 is a perspective view showing a first stopper of a moving mechanism stopping device according to an embodiment of the present disclosure.

As shown in FIG. 3, the base 20 includes a first base 22 that is detachably fixed to the bearing surface 142 and a second base 23 that is detachably fixed to the first base 22.

Figure 4:
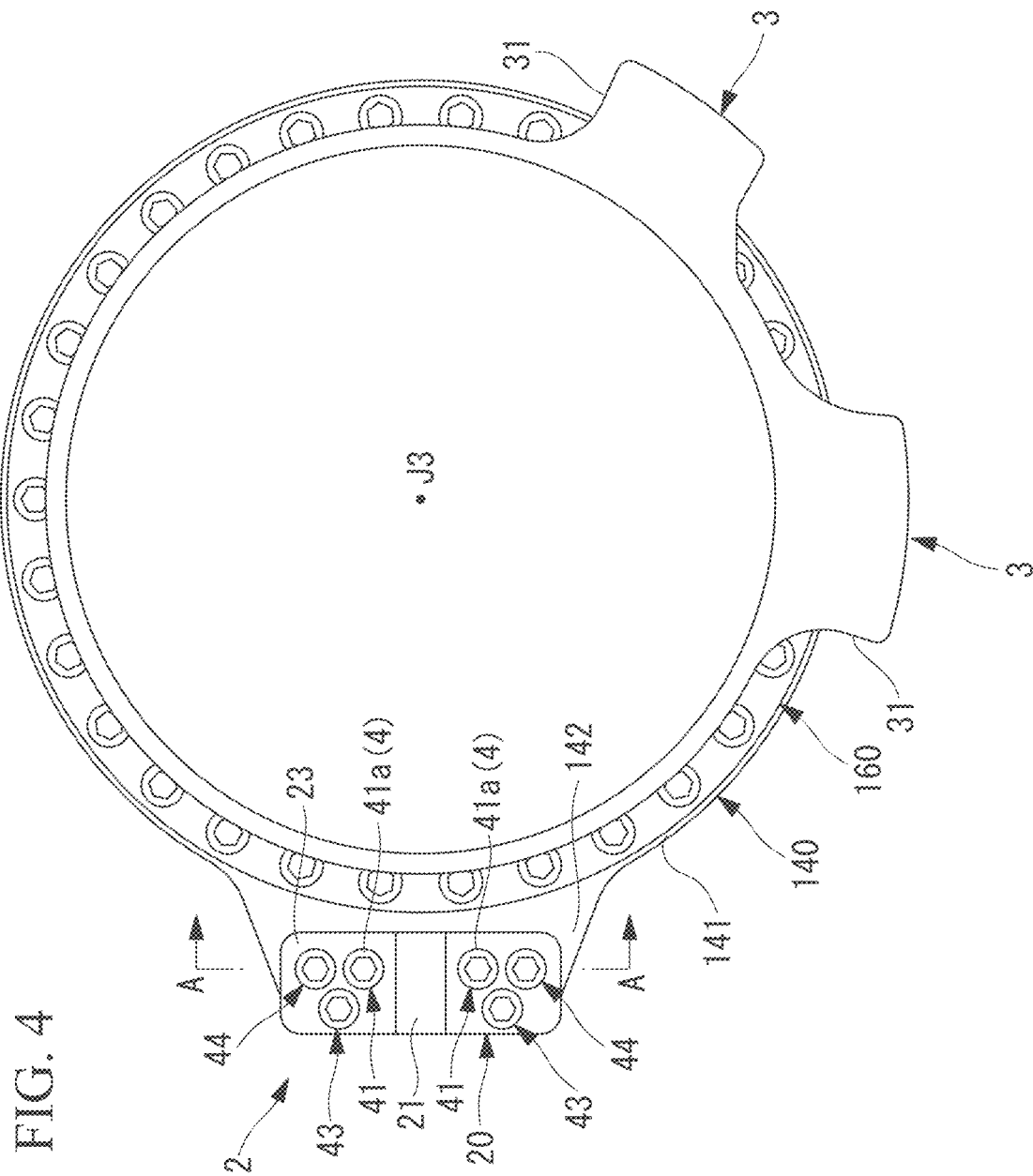
FIG. 4 is a schematic diagram of the rotary joint mounted with the moving mechanism stopping device in FIG. 3, as viewed from a direction along a third axis.

As shown in FIG. 4, the bearing surface 142 is provided in a portion in which part of a casting constituting the second arm 140 is projected radially outward about the third axis J3. As shown in FIG. 3, the first base 22 is formed in an elongated rectangular strip shape and is fixed to the bearing surface 142 such that a length direction is aligned with the circumferential direction around the third axis J3, a width direction is aligned with the radial direction, and a plate thickness direction is aligned with the third axis J3 direction. The second base 23 has dimensions equivalent to the first base 22 in the length direction and the width direction, and is fixed to the first base 22 in a state of being overlapped with the first base 22 in the plate thickness direction.

The protrusion 21 and the second base 23 are integrally configured by cutting a steel material having relatively high ductility, for example, a rolled steel material for general structures. The protrusion 21 protrudes, in a cantilever manner, in the plate thickness direction of the second base 23 from the center in the length direction of the second base 23.

As a result of fixing the second base 23 to the first base 22 fixed to the bearing surface 142 of the second arm 140, as shown in FIG. 2, the protrusion 21 is disposed at a position where the protrusion 21 is brought close to the first arm 130 in a direction along the third axis J3 from the bearing surface 142 by a dimension corresponding to the sum of the plate thickness dimensions of the first base 22 and the second base 23. Because the bearing surface 142 is projected radially outward of the second arm 140, as shown in FIG. 4, the protrusion 21 is also disposed at a position radially and outwardly apart from a side surface of the reducer 160. At this time, the protrusion 21 is arranged so as to extend in the direction along the third axis J3 and in the radial direction about the third axis J3.

As shown in FIG. 2, the second stopper 3 is configured as a result of part of a casting constituting the first arm 130 being projected, in the direction along the third axis J3, farther toward the second arm 140 than an end surface 131 on the reducer 160 side. As shown in FIG. 4, the second stopper 3 has part of the casting constituting the first arm 130 also projected radially outward and forms two abutting surfaces 31 extending in the radial direction about the third axis J3. In an example shown in the figure, the second stopper 3 is provided at two locations spaced apart in the circumferential direction around the third axis J3, and each of the second stoppers 3 is provided with one abutting surface 31.

Each of the abutting surfaces 31 is disposed at a position in the radial direction about the third axis J3, which overlaps the protrusion 21 of the first stopper 2 fixed to the second arm 140, and at a position in the third axis J3 direction. With this configuration, when the first arm 130 and the second arm 140 rotate relative to each other about the third axis J3, the protrusion 21 comes into collision with the abutting surface 31 of the second stopper 3 at positions beyond opposite ends of a relative operating range of the second arm 140 with respect to the first arm 130.

Because the second stopper 3 is formed of part of the casting constituting the first arm 130, the second stopper 3 has sufficient strength so as not to plastically deform even when coming into collision with the first stopper 2.

Figure 5:
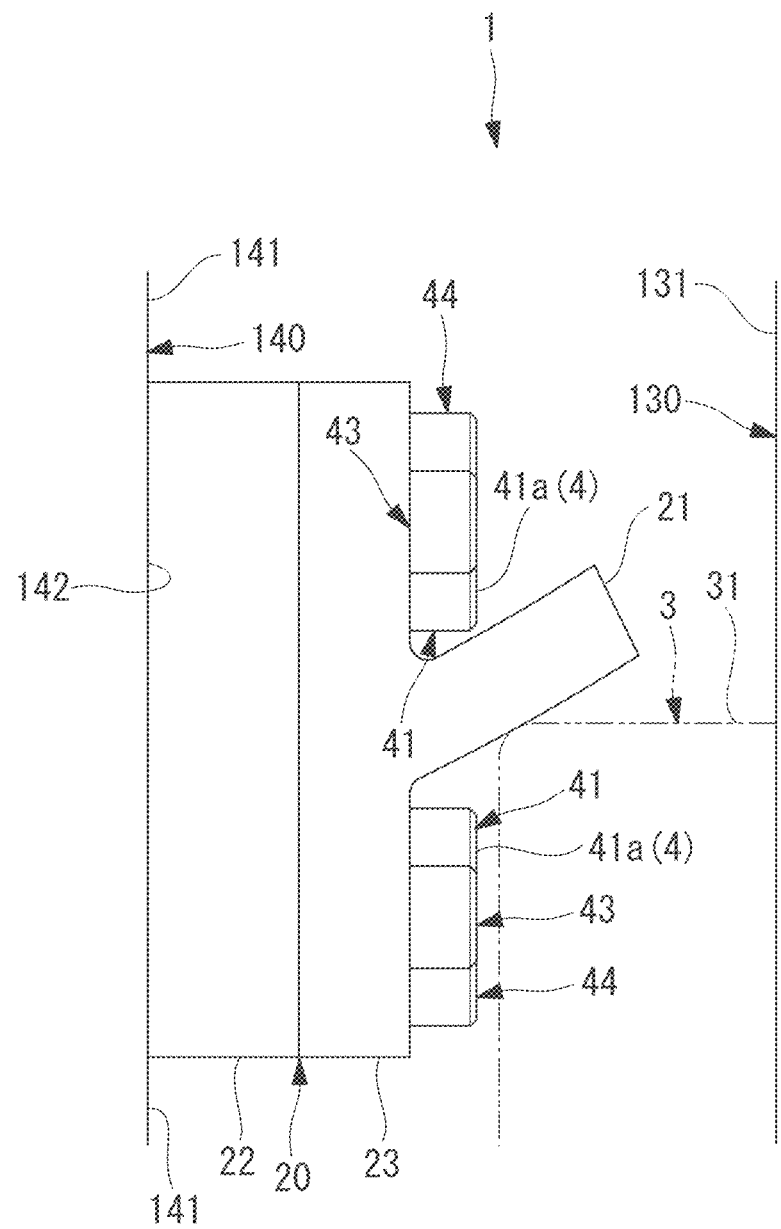
FIG. 5 is a front view showing a state in which the first stopper of the moving mechanism stopping device in FIG. 3 is plastically deformed by collision of a second stopper.

Meanwhile, as for the first stopper 2, the protrusion 21 that comes into collision with the abutting surface 31 of the second stopper 3 is plastically deformed due to the collision so as to fall to the side opposite to the second stopper 3 in the circumferential direction around the third axis J3, as shown in FIG. 5. Because the second base 23 and the protrusion 21 are formed of a rolled steel material for general structures, which has relatively high ductility, the protrusion 21 is plastically deformed in a form in which the protrusion 21 tips over from the root without breaking from the second base 23.

As shown in FIG. 3, the deformation restriction members 4 are constituted of head parts 41a of bolts (first bolts) 41 that are provided on both sides of the protrusion 21 in the plate thickness direction, with gaps from the protrusion 21, and that are fastened into screw holes 23a in the second base 23. The first bolts 41 are formed of a material having higher rigidity than the rolled steel material for general structures, constituting the second base 23 and the protrusion 21, for example, a chromium-molybdenum steel material.

In this embodiment, the head parts 41a of the first bolts 41 constituting the deformation restriction members 4 are arranged at positions close to both surfaces of the protrusion 21 in the circumferential direction around the third axis J3 and also at radially inward positions, in other words, positions closest to the end surface (outer circumferential surface) 131 of the first arm 130 in the radial direction.

Figure 6:
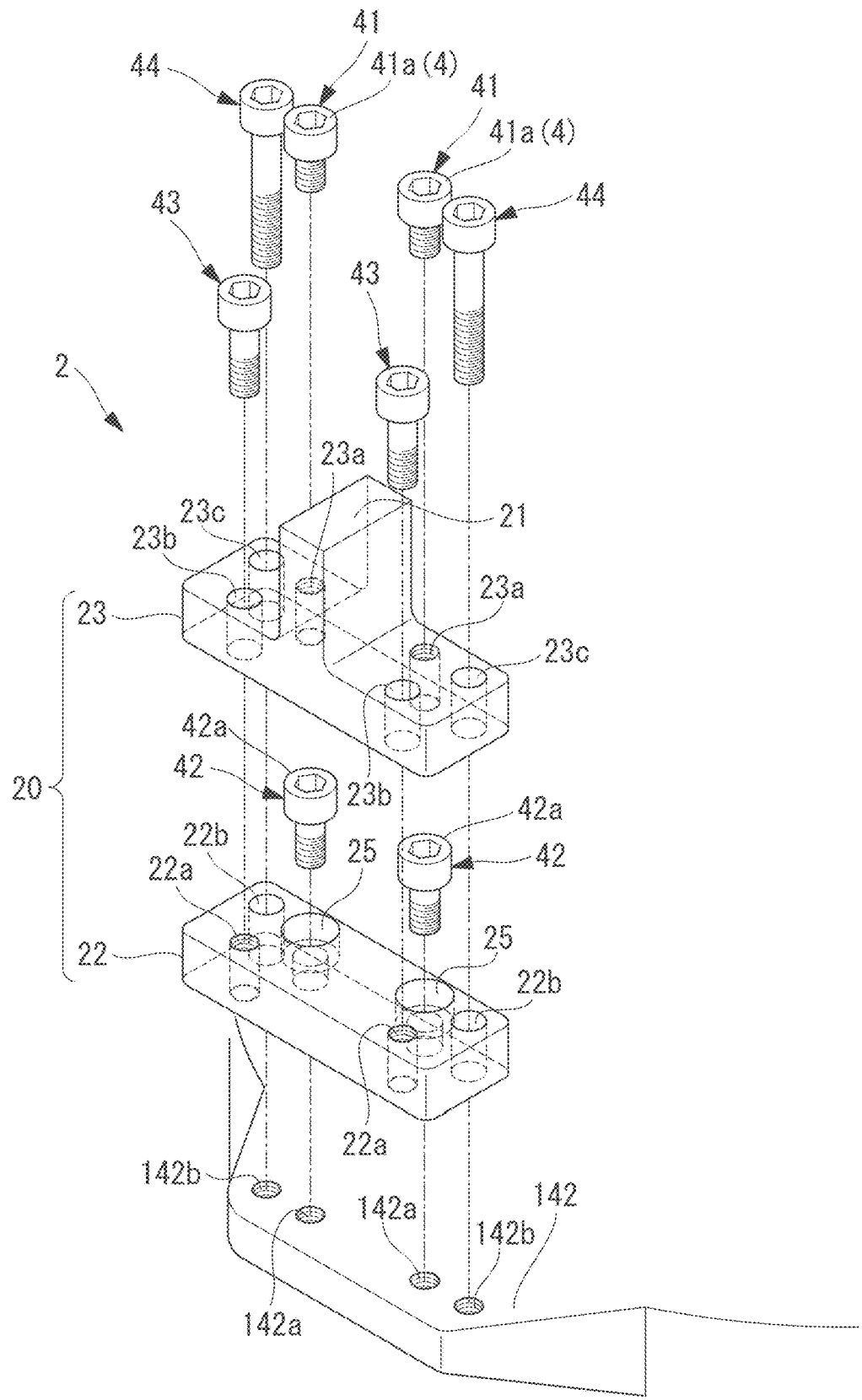
FIG. 6 is an exploded perspective view for explaining the configuration of the first stopper in FIG. 3.
Figure 7:
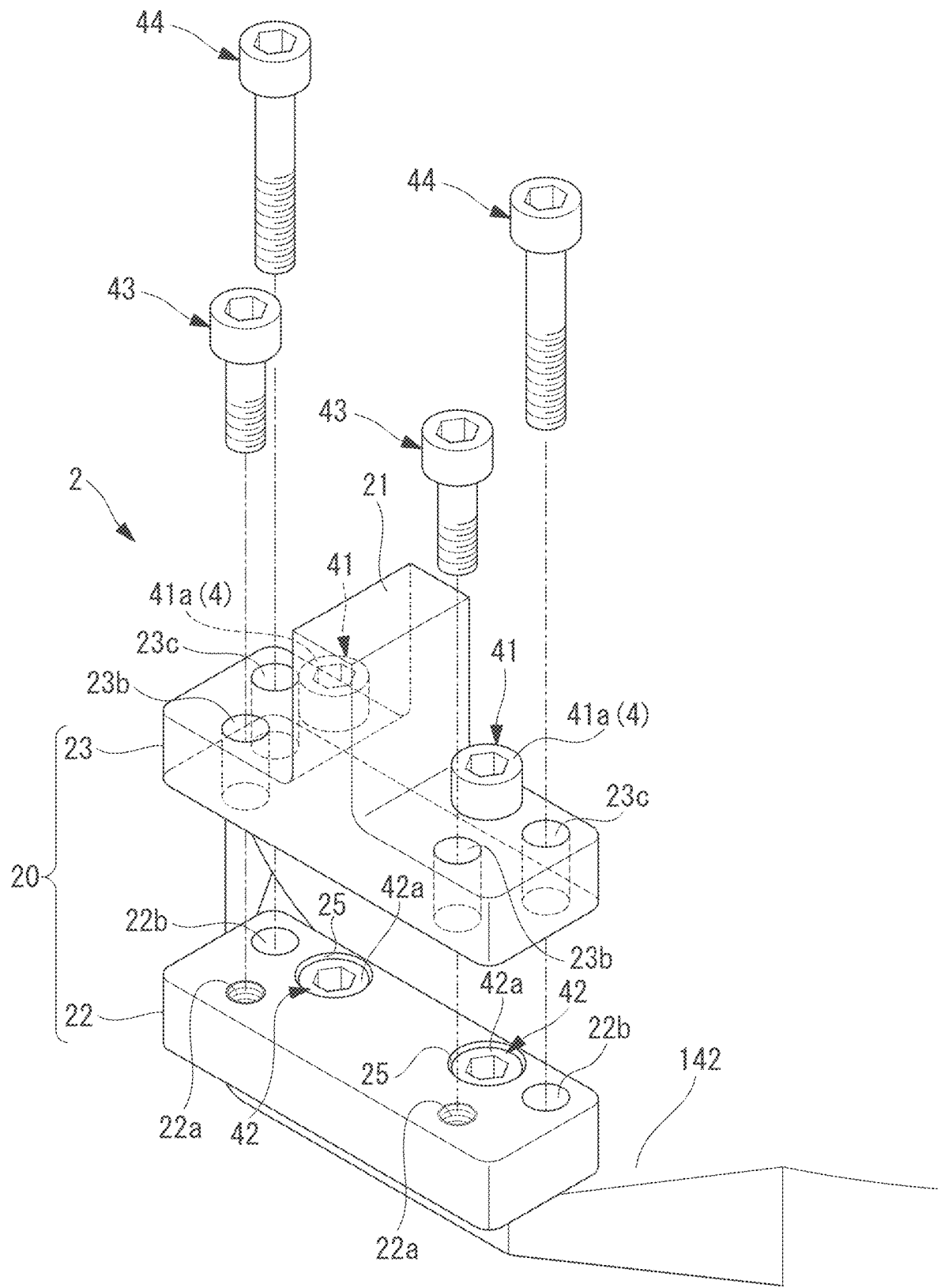
FIG. 7 is an exploded perspective view showing a state in which a first base of the first stopper in FIG. 6 is fixed to a bearing surface.

As shown in FIGS. 6 and 7, the first base 22 of the first stopper 2 is fixed to the bearing surface 142 of the second arm 140 by fastening two bolts (second bolts) 42 into screw holes 142a in the bearing surface 142. The first base 22 is provided with two counterbores 25 capable of completely accommodating respective head parts 42a of the two second bolts 42.

After the first base 22 is fixed to the bearing surface 142, the second base 23 in which the two first bolts 41 are fastened into the screw holes 23a is overlapped with the first base 22 in the plate thickness direction, and two bolts (third bolts) 43 are made to pass through through-holes 23b in the second base 23 to be fastened into screw holes 22a in the first base 22, whereby the second base 23 is fixed to the first base 22.

Figure 8:
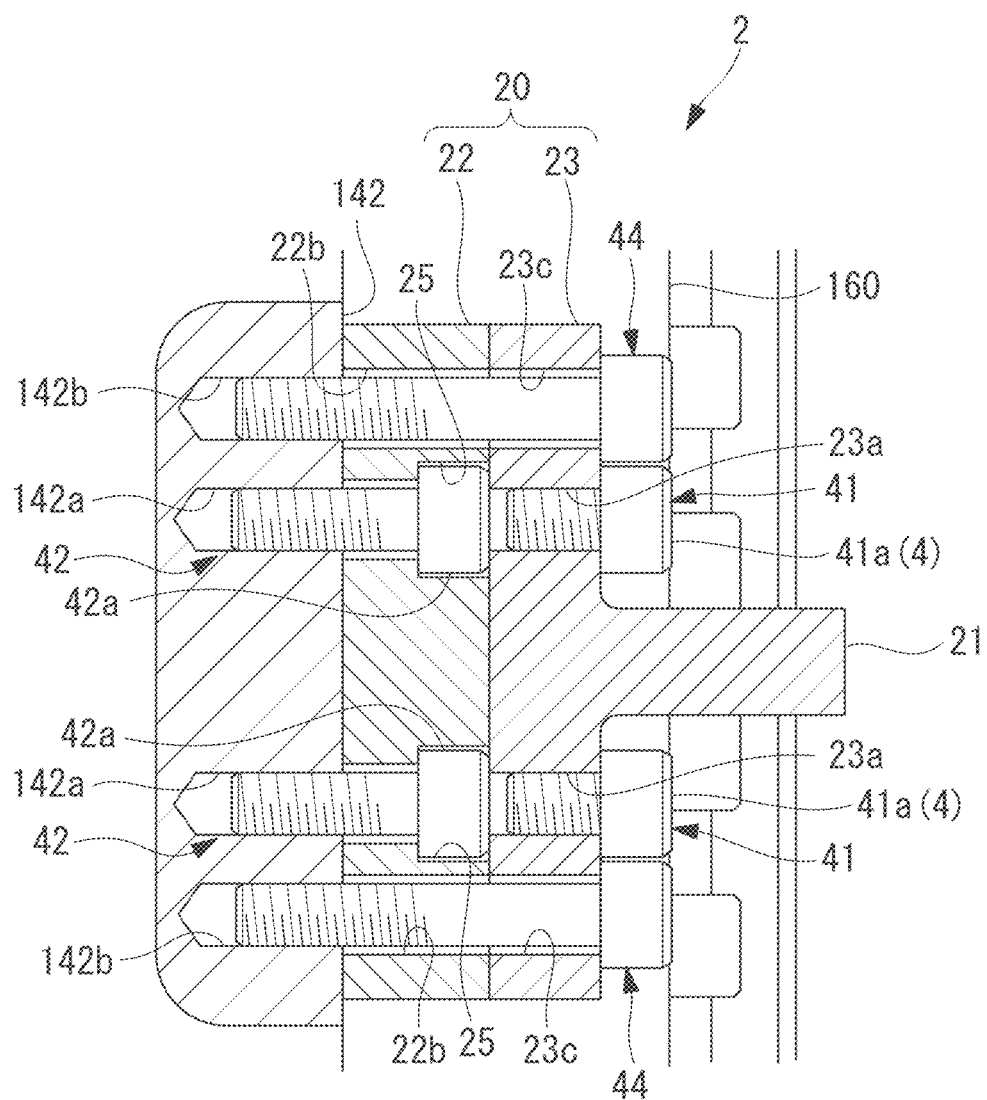
FIG. 8 is a longitudinal sectional view of the first stopper in FIG. 3, taken along the line A-A in FIG. 4.

As shown in FIG. 8, the second bolts 42 are arranged on the axial extension of the first bolts 41. Here, the axial extension includes a case in which the axes of the first bolts 41 are completely coincident with the axes of the second bolts 42, as well as a case in which the axes are slightly offset.

The attachment of the first bolts 41 to the second base 23 may be performed before or after the second base 23 is attached to the first base 22. In other words, the first bolts 41 do not contribute to the attachment of the second base 23 to the first base 22.

Furthermore, as shown in FIG. 8, two bolts (third bolts) 44 are fastened into screw holes 142b in the bearing surface 142 through through-holes 22b, 23c provided in the first base 22 and the second base 23 stacked in the plate thickness direction, whereby the first base 22 and the second base 23 are fastened together to be fixed to the bearing surface 142. Thus, the attachment of the first stopper 2 to the bearing surface 142 of the second arm 140 is completed.

The first base 22 is fixed to the bearing surface 142 of the second arm 140 by means of a total of four bolts, namely, the two second bolts 42 and the two third bolts 44. In addition, the second base 23 is fixed to the first base 22 by means of the four third bolts 43, 44. Therefore, it is possible to bring the first base 22 into close contact with the bearing surface 142 and to bring the first base 22 into close contact with the second base 23 by means of equivalent surface pressures, thereby generating a sufficient frictional force so as not to cause a significant misalignment even by collision.

The operation of the thus-configured moving mechanism stopping device 1 and robot 100 according to this embodiment will be described below.

With the moving mechanism stopping device 1 according to this embodiment, when the first stopper 2 and the second stopper 3 come into collision with each other, the collision energy is consumed by plastic deformation occurring in the protrusion at the time of collision, and the relative rotation of the first arm 130 and the second arm 140 is stopped.

In other words, since a stopper configured to plastically deform the protrusion 21 is employed as the first stopper 2, there is an advantage in that it is possible to achieve a compact configuration as compared with a stopper not involving plastic deformation. In addition, when the protrusion 21 is plastically deformed due to the collision, the protrusion 21 comes close to the head part 41a of the first bolt 41 that is arranged with a gap in a plastic deformation direction, in other words, in the circumferential direction around the third axis J3, and when a further deformation occurs, the gap is eliminated and the protrusion 21 comes into contact with the head part 41a of the first bolt 41.

With this configuration, the first bolt 41 can restrict further plastic deformation of the protrusion 21. Because the first bolt 41 for restricting the plastic deformation of the protrusion 21 is formed of a material having higher rigidity than the material of the protrusion 21, the first bolt 41 reliably receives and restricts the plastic deformation of the protrusion 21, thereby making it possible to more reliably stop coasting of the relative rotation between the first arm 130 and the second arm 140.

In this case, the head part 41a of the first bolt 41 is arranged so as to be spaced apart from a side surface of the protrusion 21 in the circumferential direction around the third axis J3 in the initial stage in which the protrusion 21 begins to plastically deform after the collision, and thus, the plastic deformation of the protrusion 21 is not inhibited by the head part 41a of the first bolt 41. Therefore, the protrusion 21 can be plastically deformed so as to bend from a root portion thereof connected to the second base 23, and can sufficiently consume the impact energy.

The root of the protrusion 21 is provided with a rounded surface, which makes it possible to prevent breakage due to excessive stress concentration at the time of collision. In addition, after the collision energy is sufficiently consumed by the plastic deformation of the protrusion 21, it is possible to effectively restrict further plastic deformation as a result of the protrusion 21 being pressed against the head part 41a of the first bolt 41 having high rigidity.

If the head part 41a of the first bolt 41 is in contact with the side surface of the protrusion 21 from the beginning, or if a stepped part is provided integrally with the protrusion 21, instead of the head part 41a of the first bolt 41, the deformation root of the protrusion 21 would be located on an end surface of the stepped part or the head part 41a of the first bolt 41. In these cases, the deformation root of the protrusion 21 is too close to the second stopper 3 in the direction along the third axis J3 and there is a risk of shear breakage. In contrast, as in this embodiment, by providing a gap between the head part 41a of the first bolt 41 and the side surface of the protrusion 21, it is possible to separate the deformation root of the protrusion 21 to the surface of the second base 23, and to plastically deform the protrusion 21 without shear breakage.

In addition, in this embodiment, the plastically deformable first stopper 2 is detachably attached to the second arm 140; thus, the second stopper 3 can be configured so as not to plastically deform and can be configured integrally with the casting constituting the first arm 130. In other words, the second stopper 3 can be configured in a simple shape in which part of the casting constituting the first arm 130 is projected radially outward about the third axis J3.

Figure 9:
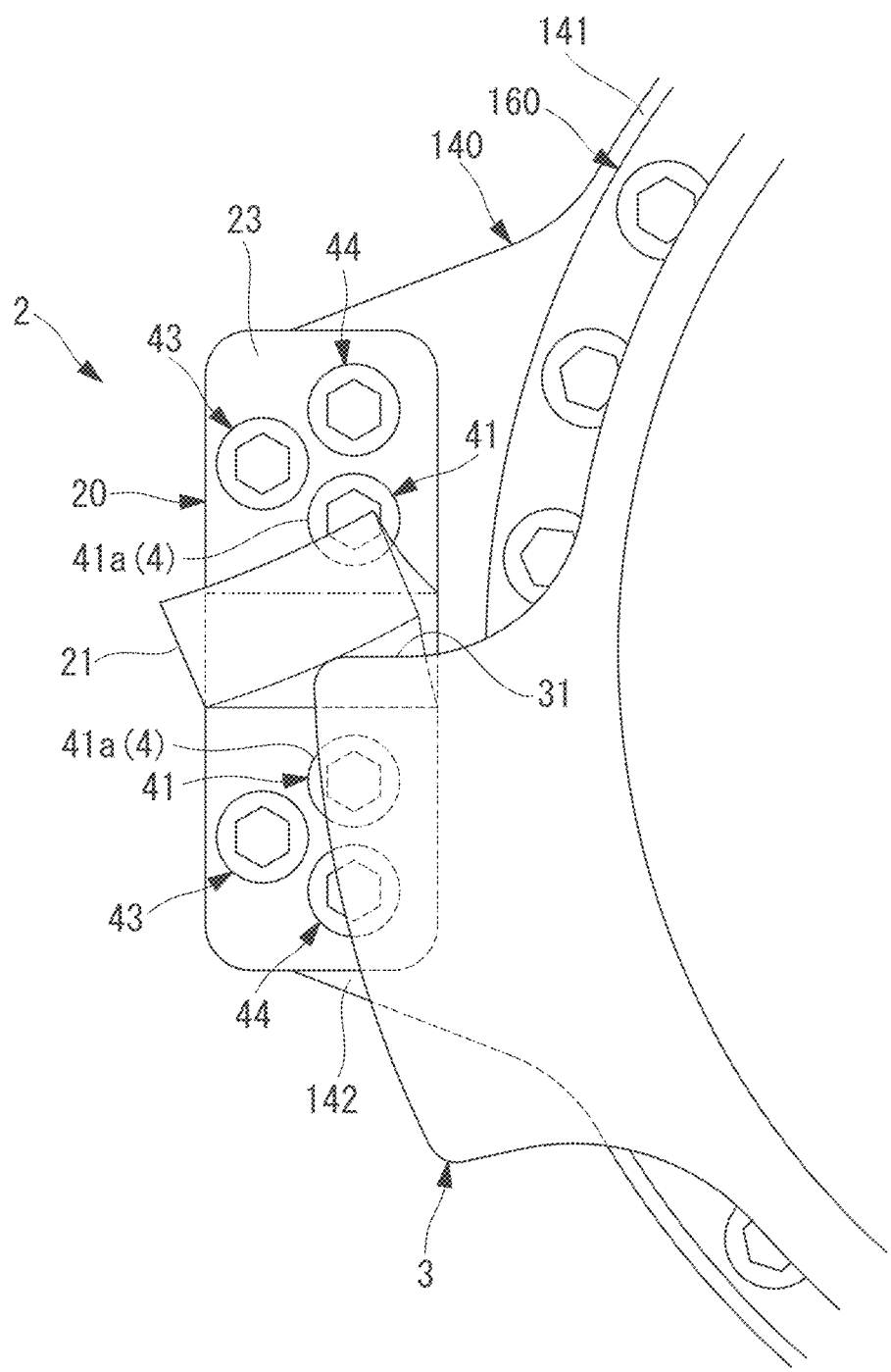
FIG. 9 is a diagram showing the plastic deformation of a protrusion of the first stopper in FIG. 5 in more detail, as viewed from the direction along the third axis.

In addition, because the second stopper 3 has a structure projecting radially outward, the protrusion 21 of the first stopper 2 with which the second stopper 3 has come into collision is typically plastically deformed such that the radially inner side about the third axis J3 is twisted more than the radially outer side, as shown in FIG. 9.

In contrast, by arranging the head part 41a of the first bolt 41 on the radially inner side about the third axis J3, the head part 41a of the first bolt 41 can be brought into contact with a portion of the protrusion 21 that is plastically deformed by a large amount to restrict the plastic deformation.

In addition, the first stopper 2 in which the protrusion 21 has plastically deformed can be replaced by removing the base 20 from the second arm 140. In this case, the protrusion 21 that has plastically deformed makes it difficult to remove the first bolt 41 with which the protrusion 21 is in contact. However, because the first bolts 41 are not involved in the attachment of the second base 23 to the first base 22, it is possible to easily remove the second base 23 from the first base 22 by removing the four third bolts 43, 44.

In addition, after the second base 23 is removed from the first base 22, it is possible to easily remove the first base 22 from the bearing surface 142 by removing the second bolts 42. The first base 22 is considered to be less damaged compared to the second base 23, and thus can be reused.

In addition, in this embodiment, only the first stopper 2 is employed as a stopper to be plastically deformed due to collision. By doing so, it suffices to replace only the first stopper 2 after the collision, and with the simple configuration in which the second stopper 3 is configured integrally with the first arm 130, it is possible to achieve reductions in size and cost.

In addition, in this embodiment, the base 20 is separated into the first base 22 and the second base 23, and the first base 22 and the second base 23 are fastened to each other by means of the bolts 43, 44. With this configuration, the collision energy is consumed by plastically deforming the protrusion 21 and is also consumed by friction between contact surfaces of the first base 22 and the second base 23. As a result, it is possible to more effectively stop the relative rotation between the first arm 130 and the second arm 140.

In addition, in the case in which the first stopper 2 is detachably fixed to the second arm 140, there is a number of fixing bolts required to withstand the impact of collision; however, the placement of the first bolts 41 that do not contribute to the fixation takes up an installation space for the fixing bolts. In this embodiment, the base 20 is divided into the first base 22 and the second base 23, and the second bolts 42 for fixing the first base 22 to the bearing surface 142 are arranged on the axial extension of the first bolts 41. With this configuration, it is possible to secure an installation space for the number of bolts required to detachably fix the first stopper 2 to the second arm 140, for example, the two second arms and the two third bolts 44, while preventing an increase in the size of the first stopper 2 and an increase in the size of the bearing surface 142.

Figure 10:
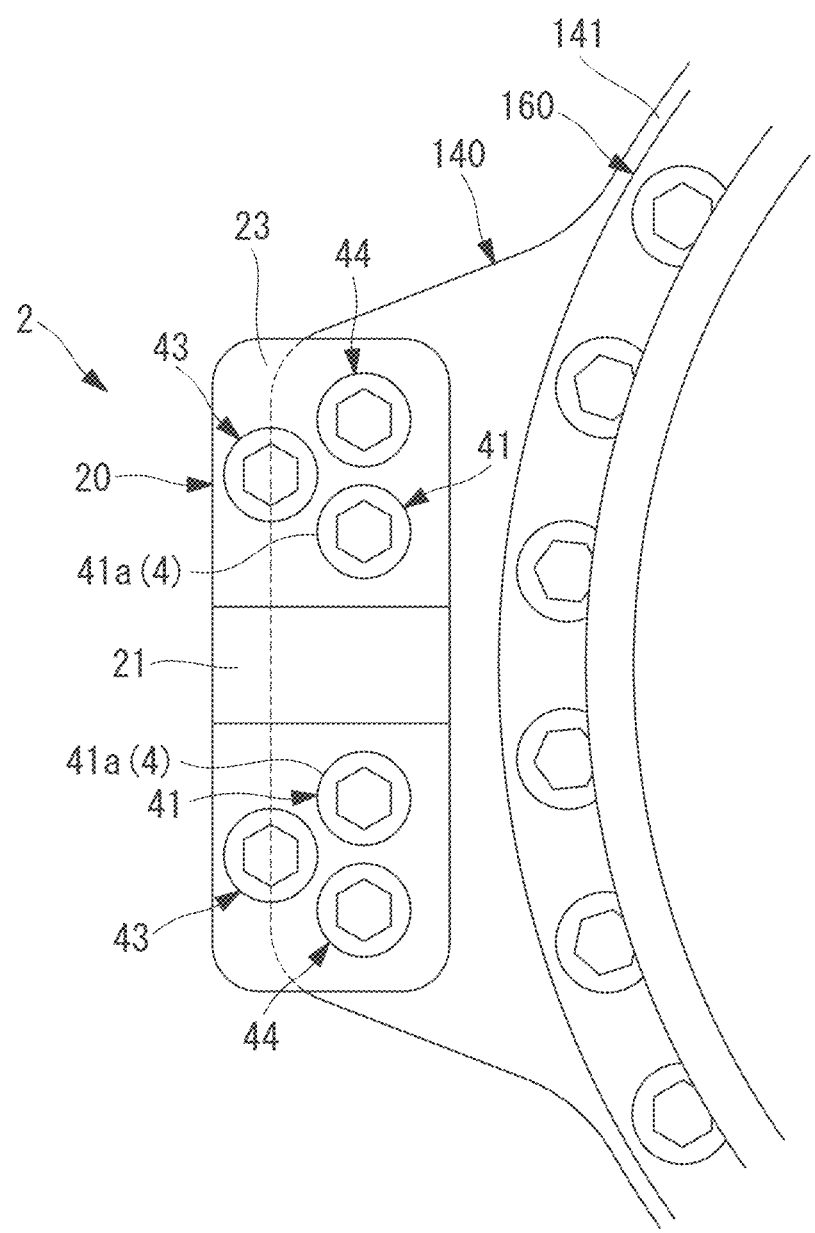
FIG. 10 is a diagram showing a relationship between the first stopper in FIG. 3 and the bearing surface to which the first stopper is attached, as viewed from the direction along the third axis.

In addition, in this embodiment, the two third bolts 43 are fastened into the screw holes 22a in the first base 22, at positions farthest from the third axis J3 in the radial direction. With this configuration, as shown in FIG. 10, it is not necessary to provide the screw holes 22a, into which the third bolts 43 are fastened, in the bearing surface 142, and thus, it is possible to reduce the amount of radial projection of the bearing surface 142. In other words, it is possible to achieve cost reduction by preventing an increase in the size of the casting constituting the second arm 140. Note that, in a case in which a radial or circumferential expansion of the bearing surface 142 is permissible, the screw holes 22a into which the third bolts 43 are fastened may be provided in the bearing surface 142, and the first base 22 and the second base 23 may be fastened together by means of the second bolts 42 and the two third bolts 43, 44.

In addition, in this embodiment, the first bolts 41 are fixed to the second base 23 on both sides of the protrusion 21 in the plate thickness direction. With this configuration, even when the second stopper 3 comes into collision with either surface of the cantilever-like protrusion 21 in the plate thickness direction, the plastic deformation of the protrusion 21 can be restricted by the first bolt 41. In other words, the first stopper 2 can be utilized as a stopper at opposite ends of a relative rotation range of the first arm 130 and the second arm 140.

Note that, although the plastically deformable first stopper 2 is provided on the second arm 140 and the second stopper 3 that does not plastically deform is provided on the first arm 130 in this embodiment, a reverse configuration may be employed. In addition, both the first stopper 2 and the second stopper 3 may be plastically deformed.

In addition, although the contact surfaces of the first base 22 and the second base 23 are configured to be flat surfaces in this embodiment, restricting means (not shown), such as irregularities or keys and keyways that mate with each other, may be provided for restricting a relative movement about the third axis J3, in other words, a movement of the second base 23 relative to the first base 22 in a relative movement direction. The restricting means can increase the friction between the contact surfaces of the first base 22 and the second base 23 to increase the collision energy consumption, and can also reduce misalignment between the first base 22 and the second base 23 at the time of collision.

Figure 11:
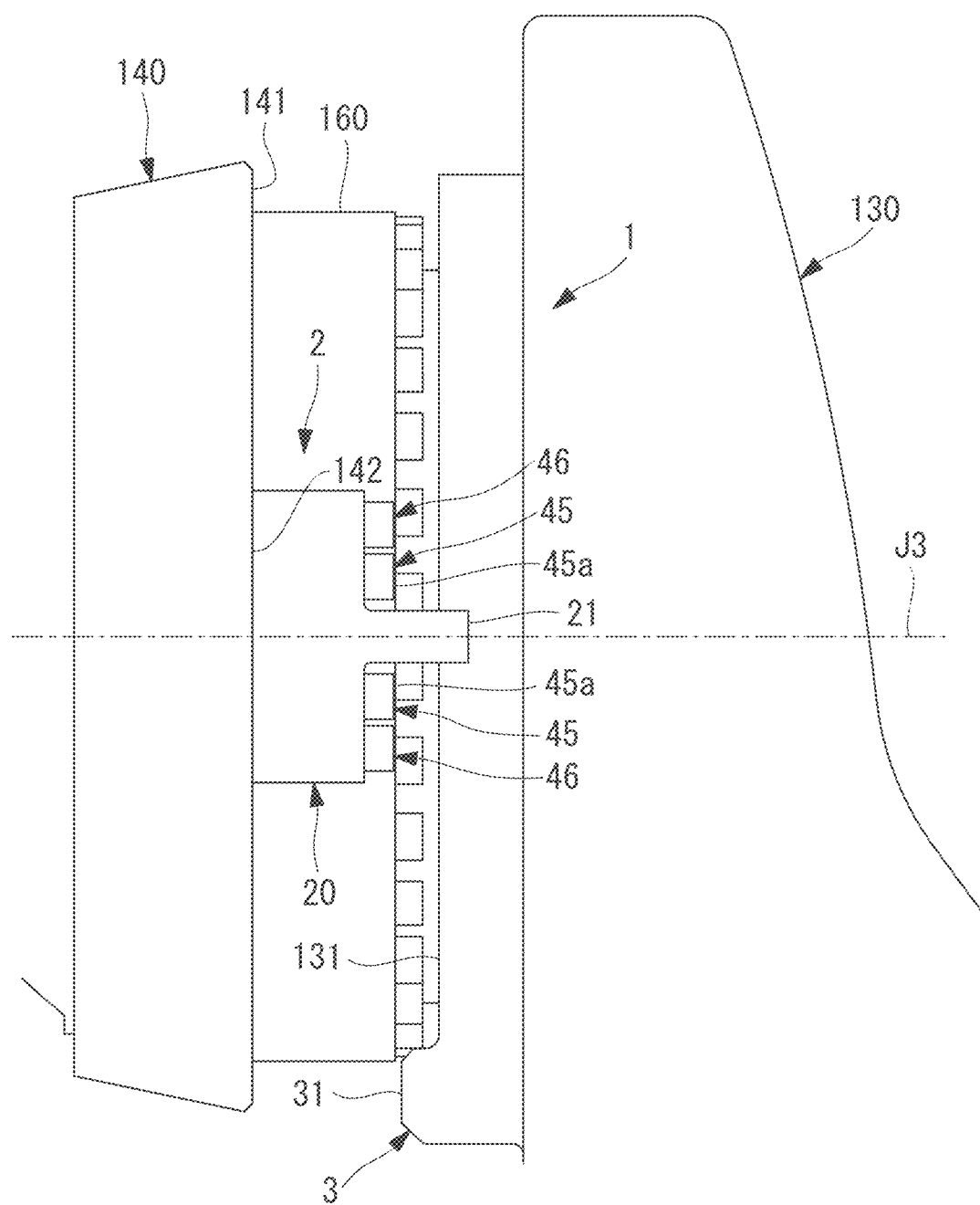
FIG. 11 is a front view showing a modification of the first stopper in FIG. 3.

In addition, although the base 20 of the first stopper 2 is divided into the first base 22 and the second base 23, and the first base 22 and the second base 23 are fastened to each other by means of the bolts 43, 44 in this embodiment, alternatively, as shown in FIG. 11, the base 20 and the protrusion 21 may be integrally configured. In this case, it is necessary to expand the base 20 and the bearing surface 142 in the radial direction about the third axis J3 or in the circumferential direction to ensure the required number of bolts 45, 46; however, this configuration affords a similar effect in that the plastically deformable protrusion 21 is restricted by a head part (deformation restriction part) 45a of the bolt 45 having high rigidity.

In addition, although the stopping device for a rotary joint of the robot 100 has been illustrated as an example in this embodiment, alternatively, it may be applied to a stopping device between two members that are linearly moved relative to each other in a moving mechanism, such as a linear motion mechanism.

The invention claimed is:

1. A moving mechanism stopping device, comprising: stoppers that are respectively provided on two members moving relative to each other, and the stoppers are configured for restricting relative movements of the members by collision of the stoppers with each other, wherein:
the two members are arranged so as to be spaced apart from each other in a direction orthogonal to a relative movement direction;
at least one of the stoppers includes a base that is detachably fixed to one of the members, a deformable part that is integrally provided on the base and that is plastically deformed by impact of collision, and a deformation restriction part that is fixed to the base so as to be spaced apart from the deformable part in the relative movement direction and that comes into contact with the plastically deformed deformable part so as to restrict further plastic deformation thereof; and
the base includes a first base that is detachably fixed to the one of the members, and a second base that is detachably fixed to the first base and in which the deformable part is integrally provided.

2. The moving mechanism stopping device according to claim 1, wherein an at least other of the stoppers is integrally provided on the other of the members and is not plastically deformed by impact of collision.

3. The moving mechanism stopping device according to claim 1, wherein a restricting means for restricting a movement of the second base relative to the first base in the relative movement direction is provided between the first base and the second base.

4. A robot comprising a plurality of joints,
the moving mechanism stopping device according to claim 1 is provided on the two members constituting at least one of the joints.

5. The moving mechanism stopping device according to claim 1, wherein the deformation restriction part is formed of a material having higher rigidity than the deformable part.

6. The moving mechanism stopping device according to claim 5, wherein the deformation restriction part is a head part of a first bolt fastened into a screw hole formed in the base.

7. The moving mechanism stopping device according to claim 1, wherein the deformation restriction part is a head part of a first bolt fastened into only a screw hole formed in the second base.

8. The moving mechanism stopping device according to claim 7, further comprising second bolts for detachably fixing the first base to the one of the members, and third bolts for detachably fixing the second base to the first base or the one of the members,
wherein at least one of the second bolts is arranged on an axial extension of the first bolt.

9. The moving mechanism stopping device according to claim 8, wherein the deformable part is formed in a flat plate shape extending in a radial direction, and the first bolt is arranged on both sides of the deformable part in a plate thickness direction.

10. The moving mechanism stopping device according to claim 9, wherein the first bolt is arranged at a position closest to an outer circumferential surface of the other of the members in the radial direction.

11. A moving mechanism stopping device, comprising: stoppers that are respectively provided on two members moving relative to each other, and the stoppers are configured for restricting relative movements of the members by collision of the stoppers with each other, wherein:
the two members are arranged so as to be spaced apart from each other in a direction orthogonal to a relative movement direction;
at least one of the stoppers includes a base that is detachably fixed to one of the members, a deformable part that is integrally provided on the base and that is plastically deformed by impact of collision, and a deformation restriction part that is fixed to the base so as to be spaced apart from the deformable part in the relative movement direction and that comes into contact with the plastically deformed deformable part so as to restrict further plastic deformation thereof;
the two members are supported so as to be relatively rotatable about a prescribed axis;
the base is fixed to a bearing surface extending radially outward of an outer circumferential surface of the other of the members so as to be orthogonal to the axis; and
the deformable part is arranged radially outward of the outer circumferential surface and extends from the base in a cantilever manner so as to be parallel to the axis.

* * * * *